Figure 1:
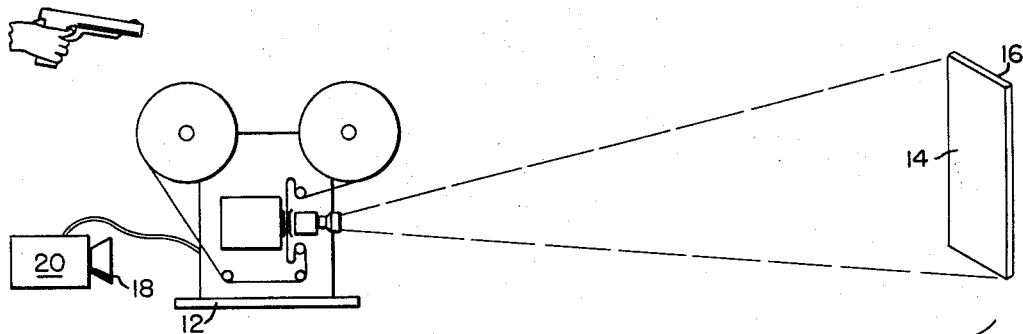

Nov. 19, 1968    R. MOLINA ET AL    3,411,785

STOP CONTROL FOR MOVING PICTURE TARGET PROJECTOR

Filed Jan. 18, 1965

INVENTORS
ROGER MOLINA,
ELMER J. KOEPPLIN

BY
ATTORNEY

United States Patent Office 3,411,785
Patented Nov. 19, 1968

3,411,785
STOP CONTROL FOR MOVING PICTURE
TARGET PROJECTOR
Roger Molina, Fairport, and Elmer J. Koepplin, Rochester, N.Y., assignors to Crosman Arms Company, Inc., Fairport, N.Y., a corporation of New York
Filed Jan. 18, 1965, Ser. No. 426,270
2 Claims. (Cl. 273—105.1)

This invention relates to equipment for target shooting, and more particularly, but not necessarily exclusively, to a novel arrangement which facilitates accurate scoring of shooting at moving target images projected by motion pictures, thus enabling practice shooting under simulated field conditions.

Practice shooting has heretofore been confined primarily to shooting at standard bull's-eye targets or at light images formed by projecting still pictures upon a paper screen backed by a suitable projectile-absorbing or backstop material. Still picture target shooting has been found to be advantageous and superior to ordinary bull's-eye target shooting for training police and military personnel in the careful and accurate use of firearms under field conditions; but still picture target practice still leaves something to be desired. Both a soldier and a police officer should be trained to recognize and pick out of a moving group or crowd an enemy or a criminal; and a still picture target will not give complete training in that regard.

The present invention achieves a further step in the required training in that it enables practice shooting at moving targets projected by motion pictures, which much more closely simulate actual field conditions than do still pictures. The principal problem involved in practice shooting at motion picture targets is that of scoring, that is, of checking the accuracy and the judgment of the marksman. It becomes necessary to stop the motion picture immediatley after each shot is fired so that the location of impact of the projectile may be checked against the instantaneous locations of the desired target as distinguished from other objects depicted in the picture. Otherwise, the positions of the target and of other objects may be so changed in later frames of the motion picture as to make checking of the shots difficult if not impossible.

The primary object of the present invention is to provide means enabling practical use of motion pictures in projecting images onto a target screen for practice shooting at such images. To this end an important object of the invention is to provide practical means for facilitating the scoring of practice shots at targets projected by motion pictures.

To this end, also, a further object of the invention is to provide means for stopping the motion picture projector instantaneously when a shot is fired at the images being projected thereby onto a target screen, in order that the result of the shooting may be observed and checked immediately.

Other objects of the invention will be apparent hereinafter from the specification and from the recital of the appended claims.

Figure 2:
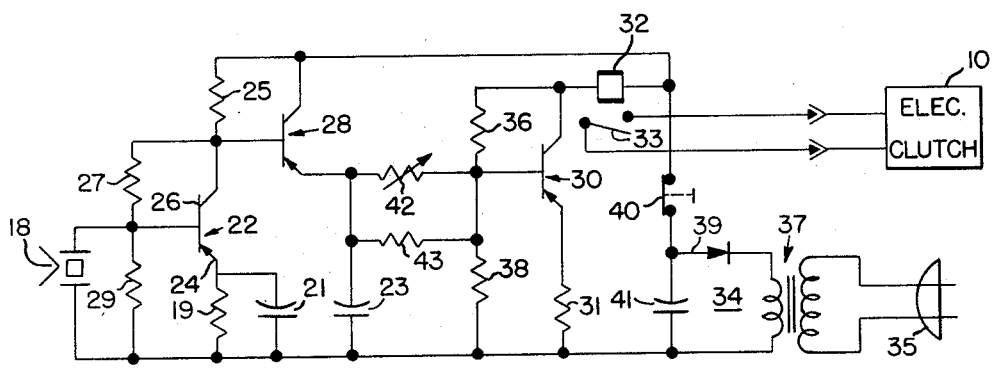

A preferred embodiment of the invention will now be described in connection with this drawing, wherein:

FIG. 1 is a schematic diagram of a shooting range constructed for practice of the invention; and FIG. 2 is a schematic circuit diagram of one electrical circuit arrangement for use in the practice of the invention.

Briefly, according to the invention, the motion picture projector used for projecting motion pictures on the shooting range is provided with a solenoid-operated or other electrically-actuatable clutch in the film drive train. A microphone is placed near the firing position on the range to receive the report of the gun shot and thereby produce an electrical signal substantially simultaneously with the firing of the gun. The signal produced by the microphone is amplified and applied to disengage the clutch in the projector. The signal is preferably fed through a self-holding circuit so that the clutch remains disengaged after the noise of the shot fades away. The film in the projector stops substantially immediately, leaving on the screen the image at which the marksman fired, for as long as desired. The hole made by the projectile in the target screen may then be compared at leisure with the image at which the marksman shot as it was at the time of his shot, and not as it is at some later time, as would be the case, if the film were stopped by a manual control.

Solenoid-operated clutches are well known and need not be described or shown herein.

Any desired conventional means may be provided in the projector for protecting the film against undue heating during the time it is stationary in the projector. For example, an auxiliary heat shield may be arranged to drop into the optical path between the source of illumination in the projector and the film when the clutch is disengaged, and to remain in the optical path at all times while the film is stopped.

The clutch designated diagrammatically at 10 in FIG. 2 is contained within the projector 12, which is positioned to project the motion picture target upon a paper screen 14. The screen 14 is backed by a projectile-absorbent or downwardly-deflecting back-up board 16 in the usual way. The microphone 18 may be mounted, as shown in FIG. 1, on the box 20 within which the amplifier is housed, and placed adjacent to the firing line on the target range. Alternatively, if desired, the amplifier and the microphone 18 may be mounted in a common housing, or within the housing of the projector 12.

The amplifier circuit shown in FIG. 2, which has been found satisfactory for use in the practice of the invention, includes a first transistor 22 connected as a grounded emitter amplifier stage, with the microphone 18 connected through a resistor 19 between the emitter 24 and the base 26 of this transistor. The resistor 19 controls the capacitor 21. The output of the first transistor 22 is fed to a second transistor 28, which is connected as an emitter follower. The second transistor is connected across the microphone through capacitor 23, resistors 19 and 25, and transistor 22, and through resistors 27 and 29. The transistors 22 and 28 and associated components form an audio amplifier to amplify the signal from the microphone to a level sufficient to trigger a third transistor 30, which is connected in the grounded emitter configuration through a resistor 31, and which acts as a switch to activate the coil 32 of a relay, which includes the switch arm 33 and controls the electric clutch 10. The coil 32 of the relay is connected across the power supply 34, which here includes a conventional wall plug 35, a transformer 37, diode 39, and capacitor 41, in series with a pair of resistors 36 and 38, and is thereby biased with holding current so that once it picks up, it remains picked up until the biasing current is cut off, as by opening of the reset switch 40, which is connected between the power supply 34 and the other elements of the circuit. The biasing current is insufficient to cause the relay to pick up. The relay picks up responsively to an amplified signal from the microphone and thereafter remains picked up until the reset switch 40 is opened.

The variable resistor or potentiometer 42, which is connected between the emitter follower transistor 28 and the output transistor 30 and in parallel with a balancing resistor 43, serves as a sensitivity control. Increasing the value of the variable resistor or potentiometer 42 reduces the proportion of the output of the emitter follower 28 that is fed to the output transistor 30. By adjustment of the variable resistor or potentiometer 42 then, the sensitivity of the stop control can be adjusted readily for varying degrees of noise level, to compensate, for instance, for different levels of background noise and different loudness of different gunshot reports.

While one particular type of amplifier has been illustrated diagrammatically in the drawing, it will be understood that any amplifier of suitable capacity and electrically connectable to the film drive train of the projector will serve the purpose. In one practical embodiment of the amplifier illustrated, the resistors 25, 29, 38 are 10K, ½ w. resistors; the resistors 27, 36 are 100K, ⅓ w. resistors; the resistors 19 and 31 are 100 ohms, ½ w. resistors; the potentiometer 42 has 25K capacity; the resistor 43 is a 100K, ½ w. resistor; the capacitor 21 is a 10 mf., 6 v. capacitor; the capacitor 23 is a 2 mf., 10 v. capacitor; the capacitor 41 is a 200 mf., 15 v. capacitor; the diode 39 is a standard IN1693 diode; the transistors are standard 2N404A transistors; the microphone is "Calrod" Model C-3; the relay is a 325 ohm, 6 v. DC relay; and the transformer is a 6.3 v. AC transformer.

In operation, when a gun is fired in the vicinity of the apparatus, the sound is picked up by the microphone 18 and is amplified by transistors 22 and 28. The amplified signal is applied to transistor 30 causing it to conduct through the relay coil 32, therepy energizing the relay and closing contact 33 which closes a circuit energizing the solenoid which operates the clutch in the drive train of the projector 12. This opens the clutch and stops the film in the projector.

In the practice of the invention, it has been found possible to stop the film practically instantaneously, so that with the frame where the film was stopped still projected on the screen an examination can be made to see how close the marksman has come to hitting the target image, at which it was intended he shoot. Thus the marksmanship can be accurately scored; and it can be determined how quick and how good the marksman's judgment was in selecting, for instance, for his target an enemy or a criminal out of a crowd of people or in bringing down first the most threatening of several opponents.

The apparatus of this invention can be used also in practicing marksmanship against any movable targets, as, for instance, wild animals.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. Apparatus for practice shooting comprising
   (a) a motion picture projector having an electrically actuatable clutch in its film drive train,
   (b) a microphone for producing an electrical signal in response to a gunshot report,
   (c) an amplifier for amplifying electrical signals produced by said microphone,
   (d) means including a relay in the output circuit of said amplifier for controlling said clutch, and electrical triggering means connected to said relay and responsive to signals amplified by said amplifier to actuate said relay and disengage said clutch,
   (e) further means in said output circuit for biasing said relay with holding current so that once said relay is actuated it remains actuated until said biasing means is disabled, and
   (f) manually controllable means for simultaneously opening said output circuit and disabling said biasing means.

2. Apparatus for practice shooting at targets projected on a screen by a motion picture projector which has a solenoid-operated clutch in its film drive train, comprising
   (a) a microphone for producing an electrical signal in response to a report of a gunshot,
   (b) means for amplifying said signal,
   (c) a relay for controlling said solenoid-operated clutch, and operative when actuated to disengage said clutch and to interrupt the operation of said drive train, and
   (d) means connecting said relay to a power supply, including
      (1) trigger means connected to the output of said amplifying means and operable in response to a signal therefrom to actuate said relay,
      (2) biasing means for supplying said relay with a biasing current, which is too small to actuate said relay, but is sufficient to hold said relay actuated after the operation of said trigger means, and
      (3) manually-operable switch means for simultaneously interrupting said trigger means and said biasing means, thereby to deactuate said relay.

References Cited
UNITED STATES PATENTS
2,342,417  2/1944  Mandell _____ 273—105.1
2,448,587  9/1948  Green _____ 273—102.2 X

FOREIGN PATENTS
536,641  5/1941  Great Britain.
545,196  5/1942  Great Britain.

ANTON O. OECHSLE, *Primary Examiner.*
M. R. PAGE, *Assistant Examiner.*